UNITED STATES PATENT OFFICE.

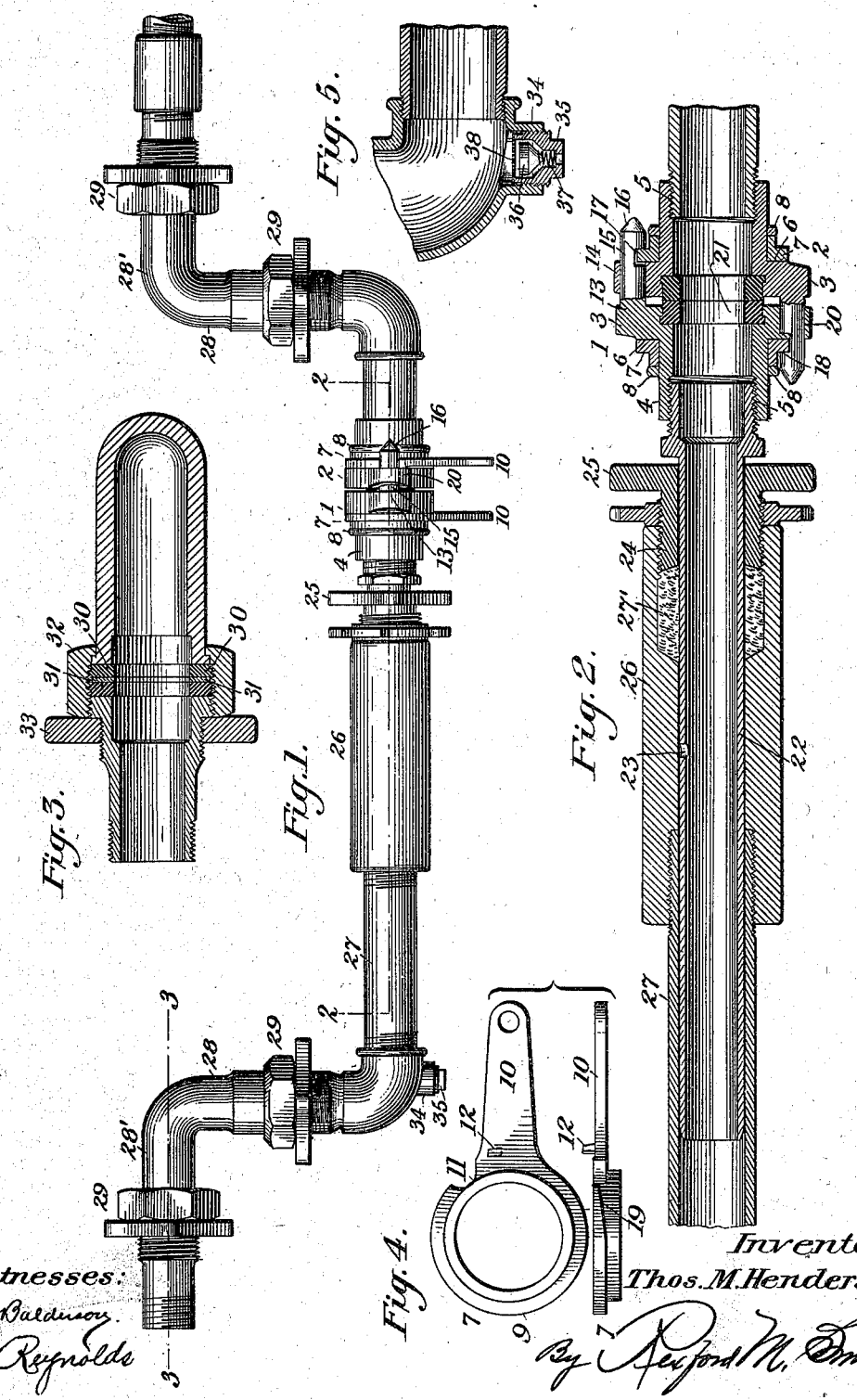

THOMAS MARSH HENDERSON, OF PORTSMOUTH, VIRGINIA, ASSIGNOR OF TWO-THIRDS TO CHARLES PADDOCK STORRS, OF WILMINGTON, DELAWARE, AND ROBERT RANDOLPH HICKS, OF NORFOLK, VIRGINIA.

TRAIN-PIPE COUPLING.

SPECIFICATION forming part of Letters Patent No. 709,401, dated September 16, 1902.

Application filed June 5, 1902. Serial No. 110,302. (No model.)

*To all whom it may concern:*

Be it known that I, THOMAS MARSH HENDERSON, a citizen of the United States, residing at Portsmouth, in the county of Norfolk and State of Virginia, have invented a certain new and useful Train-Pipe Coupling, of which the following is a specification, reference being had therein to the accompanying drawings.

This invention relates to train-pipe couplings, including a compound safety lock-joint, whereby the sections of the pipe may be quickly and effectually coupled and locked together.

One of the principal objects of the present invention is to do away with the ordinary rubber hose at present in use on passenger and freight cars forming a part of the air-brake equipment and to substitute therefor a train-pipe system composed entirely of metal, with the exception only of the necessary packing-washers to secure air-tight joints at the several places where provision must necessarily be made for relative play or movement in order to accommodate the varying positions and relations of the cars, including the engine and tender.

The coupling hereinafter described is equally well adapted to the use of compressed air or steam.

Other objects and advantages of the invention will appear in the course of the ensuing description.

The invention consists in certain novel features and details of construction and arrangement of parts, as hereinafter fully set forth, illustrated, and claimed.

In the accompanying drawings, Figure 1 is a side elevation of a sufficient portion of an air-pipe line to illustrate the application of the present improvements thereto. Fig. 2 is an enlarged central vertical section on the line 2 2 of Fig. 1, taken through the coupling proper, showing the manner of combining and locking the parts thereof together and also showing the slip-joint. Fig. 3 is an enlarged detail section on the line 3 3 of Fig. 1. Fig. 4 shows in side and edge elevation one of the cam-rings and its lever-arm.

Similar numerals of reference designate corresponding parts in all the figures of the drawings.

The compound safety lock-joint or coupling contemplated in this invention comprises, essentially, two coupling heads or sections 1 and 2, each of which is the exact counterpart of the other. Each head or section comprises a relatively large inner or abutting end portion 3 and a smaller outer end portion 4, which is internally screw-threaded, as shown at 5, to enable the coupling to be associated with the remainder of the pipe or line system at the proper point. A further object in constructing each of the parts 3 and 4 of different diameters is to provide on each a shoulder 6 to form a lateral or side bearing for a cam-ring or collar 7. This cam-ring fits between the shoulder 6 and a retaining band or collar 8, surrounding the portion 4 of the head and fixedly mounted thereon in any convenient manner. The cam-ring 7 is provided on its periphery with an annular flange 9, which is extended radially at one side to form a lever-arm or handle 10, by means of which the ring may be revolved on the coupling-head. The flange 9 is notched or cut away in semicircular form adjacent to one side of the handle 10, as shown at 11 in Fig. 4. The ring is also provided adjacent to its junction with the handle 10 with a laterally-projecting stop or limiting-shoulder 12, the purpose of which will appear. Each of the coupling-heads 1 and 2 is further provided at diametrically opposite points with radially-projecting lugs 13 and 14. Projecting laterally from the lug 13 of each head is a locking pin or stud 15, having a rounded or pointed extremity 16 and provided adjacent to its extremity with a notch 17, the outer wall 18 of which is oblique to correspond with the obliquity of the cam-flange 9 adjacent to the point 19, where said flange terminates in the notch 11, hereinabove referred to. The lug 14 of each head is provided with an opening 20 to receive the pin 15, so that the notched and pointed end of the pin on the adjacent coupling-head may be inserted therethrough.

In assembling the two heads of the coupling they are brought close to and opposite each other, as shown in Figs. 1 and 2, so that the pins 15 will pass through the openings 20, the notches 11 of the cam-rings having previously been brought into alinement with the openings 20. The handles 10 are then grasped and pulled in opposite directions, whereupon the oblique or cam-faced flanges 9 enter the notches 17 of the pins 15 and by coöperation with the oblique walls 18 effect a close jamming together of a pair of flexible packing-rings 21, having a rabbeted engagement with the coupling heads or sections, as clearly shown in Fig. 2. To uncouple the parts, the operation just described is reversed. The stop-shoulders 12 are so located on the cam-rings that when they come in contact with the lugs 14 the notches 11 register with the openings 20. By the construction described the sections or members may be quickly associated and taken apart, and when properly associated they are effectively locked together and there is no liability of their becoming accidentally disassociated.

22 designates a section of pipe which is screwed into one of the coupling heads or sections and provided at a point intermediate its ends with a vent-opening 23. The pipe 22 is slidingly mounted in a thimble or gland 24, provided with a gland-wheel 25, and screwed into a stuffing-box 26 at one end of a tubular elbow 27 and containing suitable packing 27', by means of which a tight joint is produced. The pipe 22 is mounted so that it may slide into the stuffing-box, thus providing what may be termed a "slip-joint" for compensating for variation in the distance between two cars or between the engine-tender and adjoining car. By turning the gland-wheel 25 the joint may be kept airtight. In case of derailment of the cars or accidental uncoupling of the same the slip-joint will be drawn out far enough to expose the vent-opening 22, thus instantly applying the brakes. In case the car should become entirely uncoupled the pipe 22 will be withdrawn entirely from the stuffing-box, but may be again associated therewith when the cars are brought together.

28 designates a transverse offset or angularly-bent portion of the pipe, and 28' the terminal extensions, which project substantially at right angles to the parts 28 and substantially parallel with the main body of the pipe, which is joined by the coupling-heads 1 and 2. In each of the parts 28 and 28' there is arranged what I term a "rotary box" 29, allowing the portions of the pipe at either side of the box to have a relative rotative movement. Each box is shown as inclosing two or more rubber rings or gaskets 30, between which is interposed a metal washer or ring 31, the arrangement serving to prevent the rotary packing-rings from adhering to each other when the parts become heated. This construction increases the durability by overcoming the major portion of the friction which would otherwise occur.

32 designates a coupling-nut, which encircles the packing-rings and holds the adjacent pipe extremities together, while 33 indicates a hand-operated lock-nut for fixing the adjustment of the parts and preventing the same from working loose. Each rotary box allows for the free relative rotating movement of the pipe-sections at each side thereof.

By providing the slip-joint in the pipe 22 and forming the vent-hole 23 the interfitting slip-joint may pull out automatically far enough to expose the hole 23 to the atmosphere, thus permitting the air to escape from the train-pipe and at once set the brakes and cause a stoppage of the train without any attention on the part of the engineer. The parts can be afterward readjusted and brought into the relation illustrated in Fig. 1 of the drawings.

From the foregoing description it will be seen that the ordinary flexible or rubber hose employed in connection with air-brakes is dispensed with and in lieu thereof an all-metallic construction is provided, which will be found in practice far more durable and reliable, besides adding greatly to the safety of the air-brake system on account of the fact that when the cars become uncoupled the brakes will be applied automatically without any attention on the part of the engineer.

The train-pipe coupling hereinabove described may with a slight change be adapted to a train-heating system, it only being necessary to provide additional means for draining from the pipe-line the water of condensation. This is taken care of by providing one of the elbows with a pendent tubular extension 34, as shown in Fig. 5, said extension being internally threaded to receive a screw-plug or valve-casing 35. The valve plug or casing 35 is provided with a conical valve-seat to receive a cone-shaped valve 36, which is held normally unseated or open by means of a valve-unseating spring 37, arranged in the cavity beneath the valve. The upper end of the plug or casing is closed by means of a sheet-metal or meshed-wire strainer 38, so as to prevent clogging matter from finding access to the valve-seat. In operation as soon as the steam is turned on the pressure forces the valve to its closed position, overcoming the lifting pressure of the delicate spring 37. As soon as the steam-pressure is shut off the valve unseats itself and the water of condensation can then find its way past the valve and downward through an opening in the plug or casing 35.

Various changes in the form, proportion, and minor details of construction may be resorted to without departing from the principle or sacrificing any of the advantages of the invention.

Having thus described the invention, what is claimed as new, and desired to be secured by Letters Patent, is—

1. In train-pipe couplings, a pair of pipe-sections adapted to slide one within the other, the inner section being provided with a vent-hole intermediate its ends, a stuffing-box mounted on the outer section, a gland at one end of said stuffing-box, packing within the box adapted to be compressed by the gland, and a hand-wheel or lock-nut for fixing the adjustment of the gland, substantially as described.

2. In train-pipe couplings, the combination with pipe-sections provided with couplings and a slip-joint, of angular pipe-sections having an elbow connection therewith and provided with terminal extensions substantially at right angles thereto and substantially parallel with the main pipe-sections, the angular and terminal sections being each provided with a rotary box consisting of a coupling-nut, a lock-nut, flexible packing-rings inclosed by the nut, and a metal ring interposed between the flexible rings, substantially as described.

3. In train-pipe couplings, a pair of pipe-sections each consisting of substantially horizontal terminal portions, and a transverse connecting portion, rotary boxes for permitting relative rotating movement of the transverse and end portions of the sections, couplings for uniting the adjacent ends of the pipe-sections, and a slip-joint arranged adjacent to the couplings, said joint comprising a stuffing-box, adapted to receive the slidable end portion of the other section, which slidable end portion is provided with a lateral vent-hole, substantially as and for the purpose set forth.

In testimony whereof I affix my signature in presence of two witnesses.

THOMAS MARSH HENDERSON.

Witnesses:
REXFORD M. SMITH,
GEORGE M. BOND.